United States Patent
Sarkar et al.

(10) Patent No.: US 12,181,961 B2
(45) Date of Patent: Dec. 31, 2024

(54) APPARATUS AND METHOD FOR REGULATING AVAILABLE STORAGE OF A DATA STORAGE SYSTEM

(71) Applicant: Western Digital Technologies, Inc., San Jose, CA (US)

(72) Inventors: Jay Sarkar, San Jose, CA (US); Cory Peterson, Kasson, MN (US)

(73) Assignee: Sandisk Technologies, Inc., Milpitas, CA (US)

( * ) Notice: Subject to any disclaimer, the term of this patent is extended or adjusted under 35 U.S.C. 154(b) by 11 days.

(21) Appl. No.: 17/959,899

(22) Filed: Oct. 4, 2022

(65) Prior Publication Data
US 2023/0024176 A1    Jan. 26, 2023

Related U.S. Application Data

(63) Continuation of application No. 17/182,177, filed on Feb. 22, 2021, now Pat. No. 11,500,714, which is a
(Continued)

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0727* (2013.01); *G06F 11/0751* (2013.01);
(Continued)

(58) Field of Classification Search
CPC .............. G06F 11/079; G06F 11/0727; G06F 11/0751; G06F 11/0793; G06F 11/3003;
(Continued)

(56) References Cited

U.S. PATENT DOCUMENTS

| 8,904,082 B1 | 12/2014 | Brahmadathan et al. |
| 9,703,664 B1 | 7/2017 | Alshawabkeh |

(Continued)

FOREIGN PATENT DOCUMENTS

| CN | 105224240 A | 1/2016 |
| CN | 107209548 A | 9/2017 |

(Continued)

OTHER PUBLICATIONS

Mahdisoltani et al., "Proactive error prediction to improve storage system reliability," Proceedings of the 2017 USENIX Annual Technical Conference, Jul. 2017, Santa Clara, CA, pp. 391-402.
(Continued)

*Primary Examiner* — Joseph D Manoskey
(74) *Attorney, Agent, or Firm* — Morgan, Lewis & Bockius LLP

(57) ABSTRACT

Apparatus, media, methods, and systems for data storage systems and methods for autonomously adapting data storage system performance, lifetime, capacity and/or operational requirements. A data storage system may comprise a controller and one or more non-volatile memory devices. The controller is configured to determine a category for a workload of one or more operations being processed by the data storage system using a machine-learned model. The controller is configured to determine an expected degradation of the one or more non-volatile memory devices. The controller is configured to adjust, based on the expected degradation and an actual usage of physical storage of the data storage system by a host system, an amount of physical storage of the data storage system available to the host system.

19 Claims, 5 Drawing Sheets

Related U.S. Application Data continuation of application No. 16/223,041, filed on Dec. 17, 2018, now Pat. No. 10,963,332.

(51) Int. Cl.
  *G06F 12/10* (2016.01)
  *G06N 20/00* (2019.01)
(52) U.S. Cl.
  CPC .......... *G06F 11/0793* (2013.01); *G06F 12/10* (2013.01); *G06N 20/00* (2019.01); *G06F 2212/1044* (2013.01); *G06F 2212/657* (2013.01)
(58) Field of Classification Search
  CPC .............. G06F 11/3034; G06F 12/10; G06F 2122/1044; G06F 2122/657; G06N 20/00
  See application file for complete search history.

(56) References Cited

U.S. PATENT DOCUMENTS

| | | | |
|---|---|---|---|
| 10,402,733 B1* | 9/2019 | Li | G06N 20/20 |
| 10,635,324 B1* | 4/2020 | Klein | G06F 3/0653 |
| 10,809,936 B1 | 10/2020 | Kaushik | |
| 10,884,636 B1 | 1/2021 | Abrol | |
| 10,963,332 B2 | 3/2021 | Sarker | |
| 2016/0162205 A1 | 6/2016 | Grimsrud | |
| 2017/0242592 A1 | 8/2017 | Camp | |
| 2017/0285943 A1* | 10/2017 | Dalmatov | G06F 12/0246 |
| 2018/0341857 A1* | 11/2018 | Lee | G06N 3/08 |
| 2019/0147364 A1* | 5/2019 | Alt | G06N 7/01 706/12 |
| 2019/0334786 A1 | 10/2019 | Dutta | |
| 2020/0117642 A1 | 4/2020 | Bhandaru | |
| 2021/0117101 A1 | 4/2021 | Azmandian | |
| 2023/0177345 A1* | 6/2023 | Vilcu | G06N 3/044 706/21 |
| 2023/0281470 A1* | 9/2023 | Hwang | G06N 5/022 706/12 |

FOREIGN PATENT DOCUMENTS

| | | |
|---|---|---|
| CN | 107636617 A | 1/2018 |
| CN | 108287660 A | 7/2018 |
| CN | 108804039 A | 11/2018 |
| KR | 2013-0108117 A | 10/2013 |
| KR | 2017-0014874 A | 2/2017 |
| KR | 2017-0031049 A | 3/2017 |
| KR | 2017-0046771 A | 5/2017 |
| KR | 2018-0167890 A1 | 9/2018 |

OTHER PUBLICATIONS

Mielke et al., "Reliability of Solid-State Drive Based on NAND Flash Memory," Proceedings of the IEEE, vol. 105, No. 9, Sep. 2017, pp. 1725-1750.

Narayanan et al., "SSD Failures in Datacenters" What? When? And Why?, SYSTOR '16, Jun. 6-8, 2016, Haifa Israel, 11 pages.

Sarkar et al., "Machine-Learned Assessment and Prediction of Robust Solid State Storage System Reliability Physics," Proceedings of the 2018 IEEE International Reliability Physics Symposium, Mar. 2018, 8 pages.

Sarkar et al., "Robust Error-Management and Impact of Throughput in Solid State Storage—Characterization and First System Reliability Model," 2017 Reliability and Maintainability Symposium (RAMS 2017), Orlando, FL, 2017, 6 pages.

Schroeder et al., "Reliability of NAND-Based SSDs: What Field Studies Tell US," Proceedings of the IEEE, vol. 105, No. 9, Sep. 2017, pp. 1751-1769.

Korean Office Action from Korean Patent Application No. 2019-0108997, dated Feb. 10, 2021, 12 pages including machine-generated English language translation.

\* cited by examiner

APPARATUS AND METHOD FOR REGULATING AVAILABLE STORAGE OF A DATA STORAGE SYSTEM

CROSS-REFERENCE TO RELATED APPLICATIONS

This application is a continuation of application Ser. No. 17/182,177, filed on Feb. 22, 2021, now U.S. Pat. No. 11,500,714, which is a continuation of application Ser. No. 16/223,041, filed on Dec. 17, 2018, now U.S. Pat. No. 10,963,332, the entirety of each of which is incorporated herein by reference for all purposes.

BACKGROUND

A wide range of data storage systems are generally used in a data center and other computer arrangements. Such data storage systems generally need to satisfy certain operational requirements, such as performance, and reliable operational life. While each data storage system may be configured for an expected usage, the actual usage while the data storage systems are live may be different than the expected usage. Therefore, performance may be mismatched with expectation and/or operational life of the data storage systems may degrade faster than expected and increase the risk of certain data storage systems to operate with degraded performance or be taken offline. Additionally, satisfying the operational requirements and specifications may become more difficult.

The description provided in the background section should not be assumed to be prior art merely because it is mentioned in or associated with the background section. The background section may include information that describes one or more aspects of the subject technology, and the description in this section does not limit the invention.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various configurations of the subject disclosure and is not intended to represent the only configurations in which the subject disclosure may be practiced. The appended drawings are incorporated herein and constitute a part of the detailed description. The detailed description includes specific details for the purpose of providing a thorough understanding of the subject disclosure. However, it will be apparent to those skilled in the art that the subject disclosure may be practiced without these specific details. In some instances, structures and components are shown in block diagram form in order to avoid obscuring the concepts of the subject disclosure. Like components are labeled with identical element numbers for ease of understanding.

The present description relates in general to data storage systems, and more particularly to, for example, without limitation, data storage systems and methods for autonomously adapting data storage system performance, capacity, and/or operational requirements. Data centers generally implement a large number of data storage systems that need to meet various performance and/or operational life requirements and specifications. Such data storage systems include solid-state drives, FastNAND, phase-change memory, resistive random-access memory, computational storage, and/or the like. Reliable operational life and performance of data storage systems within the operational requirements and specifications of the data storage systems may be dependent upon throughput of data being stored on a data storage system and/or entropy level of data being stored on a data storage system. In some implementations, throughput of data may refer to the amount of data transferred to and/or stored in a data storage system per unit time, such as in units of Megabytes per second (MB/s) or Input Output Operations per second (IOPs). In some implementations, throughput of a data storage system may be indicated in program/erase cycles or an average program/erase cycles consumed per unit time. In some implementations, entropy level of data may refer to how much of the data that is read from or written to in the data storage system is with sequential addresses and/or how much of the data is read from or written to with random addresses.

Figure 1:
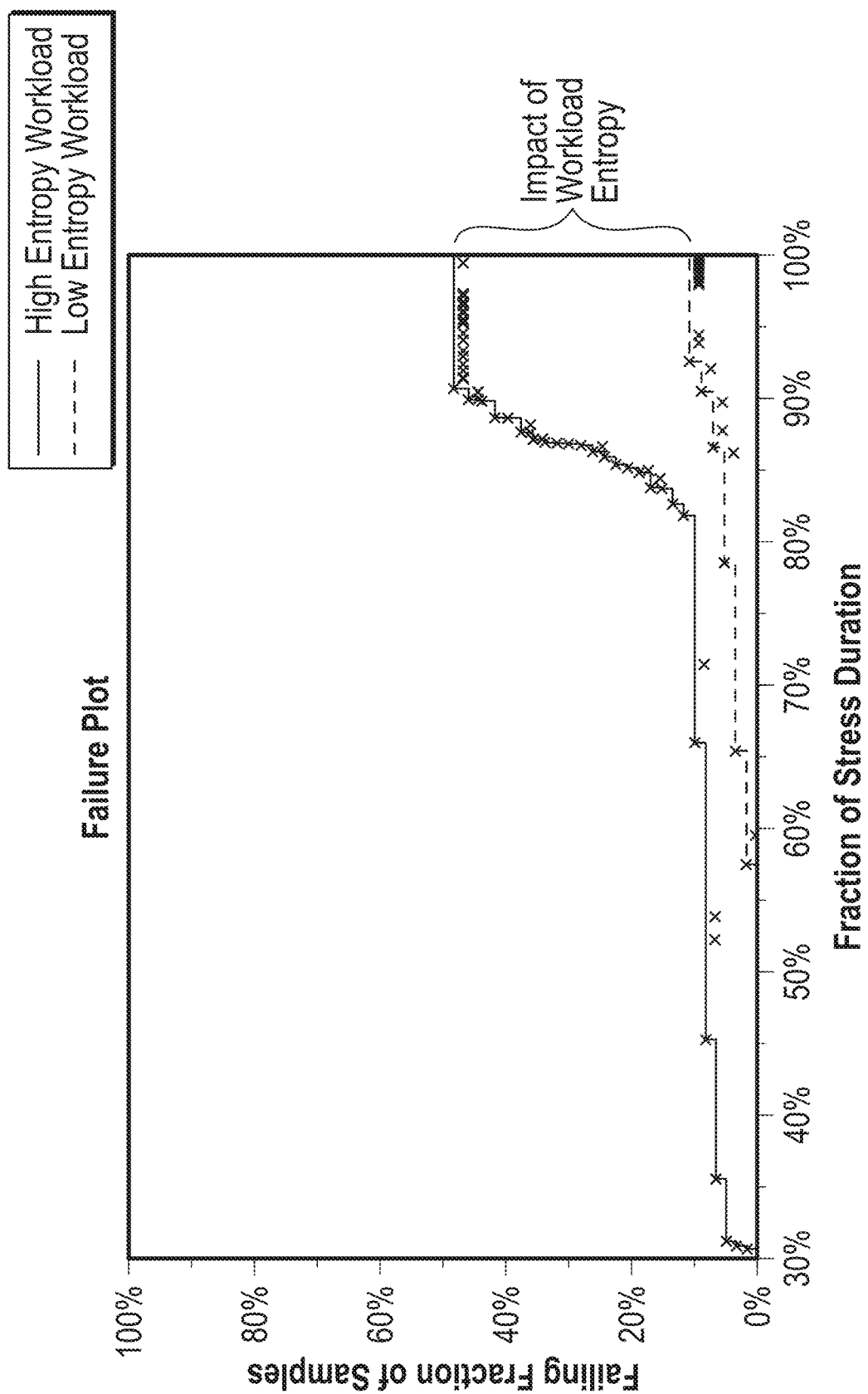
FIG. 1 depicts an example graph diagram illustrating the likelihood of data storage systems surviving and failing based on high and low entropy workloads according to illustrative implementations.
Figure 2:
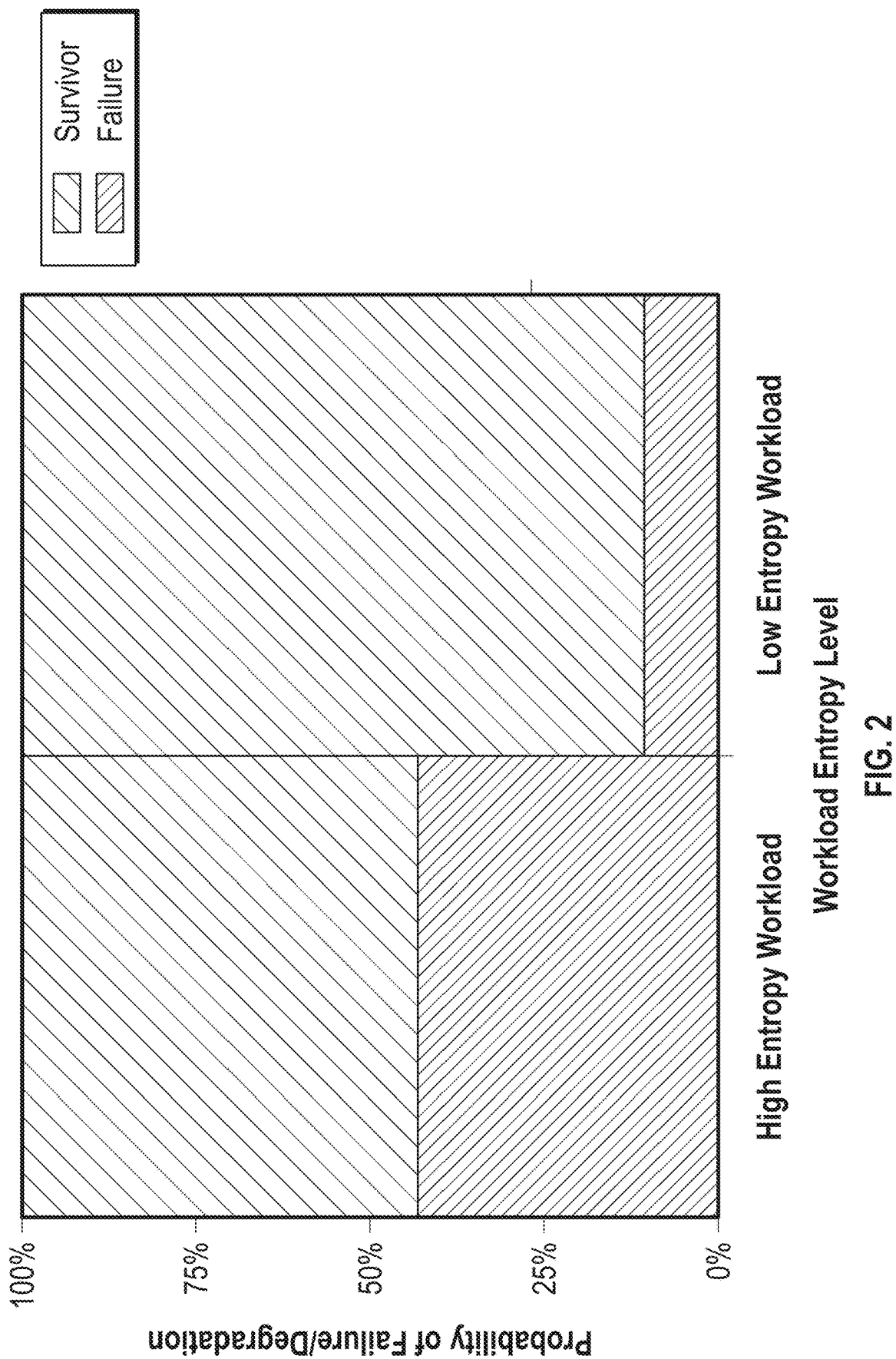
FIG. 2 depicts an example graph diagram illustrating a number of data storage systems of a population of data storage systems that survived and failed after experiencing equal durations of high and low entropy workloads, according to illustrative implementations.

An example of the relationship between the entropy level of data being written to in data storage systems and the associated likelihood and percentage of such data storage systems failing or surviving due to the respective workload stress is graphically depicted in FIGS. 1 and 2.

FIG. 1 illustrates a population or set of data storage systems that gradually failed or survived after processing data workloads with high and low entropy levels. In some implementations, a high entropy level workload may be a random workload, where data that is being read from or written to the data storage systems is stored in randomly addressed memory blocks across the pool of memory blocks available in a data storage system. In some implementations, a low entropy level workload may be a sequential workload, where data that is being read from or written to data storage systems is stored in contiguously addressed memory blocks across the pool of memory blocks available in a data storage system. The difference between the workloads processed by the population or set of data storage systems is shown in FIG. 2 illustrates a population or set of data storage systems that failed or survived after processing data workloads with a high vs. low entropy levels.

As can be seen from FIG. 1 and FIG. 2, the entropy level of a workload being processed by a data storage system affects the likelihood of the data storage systems failing or surviving. For example, as seen in FIG. 1, the data storage systems experiencing high entropy workload fail sooner and with a larger fraction than those experiencing low entropy workload. Similarly, as seen in FIG. 2, more data storage systems that process a low entropy workload survive than the data storage systems that process a high entropy workload. The data storage systems that process low entropy workloads may survive longer than the data storage systems the process high entropy workloads, and as seen in FIG. 2, a greater proportion of the data storage systems that process a low entropy workload survive than the data storage systems that process a high entropy workload.

Data storage systems that are utilized in high-throughput environments, such as data centers, process workloads of various entropy levels. Accordingly, the stress placed on each of the data storage systems varies over its lifetime, which may severely impact the performance and operational life of the data storage systems and may cause the data storage systems to breach the operational requirements and/or specifications. However, such data storage systems do not have sufficient, if any, techniques or methods that may proactively allow the data storage systems to dynamically adapt the processing ability of the data storage systems to improve the likelihood that the data storage systems satisfy and adapt with the operational requirements and/or specifications (e.g., warranty specifications).

One or more implementations of the subject technology are directed to techniques and methods that dynamically adapt the processing ability of data storage systems to improve the performance and/or operational life of the data storage systems. Techniques and methods are described herein that allow data storage systems to adjust an amount of physical storage space of a data storage system available to a host system that is communicatively coupled to the data storage system. As described herein, the data storage systems are configured to adjust an amount of physical storage space available to the host system based on one or more factors, such as a category or a type of a workload being processed by the data storage system, an expected degradation effect on the data storage system, usage history of the physical storage space of the data storage system by a host system, and the like.

Figure 3:
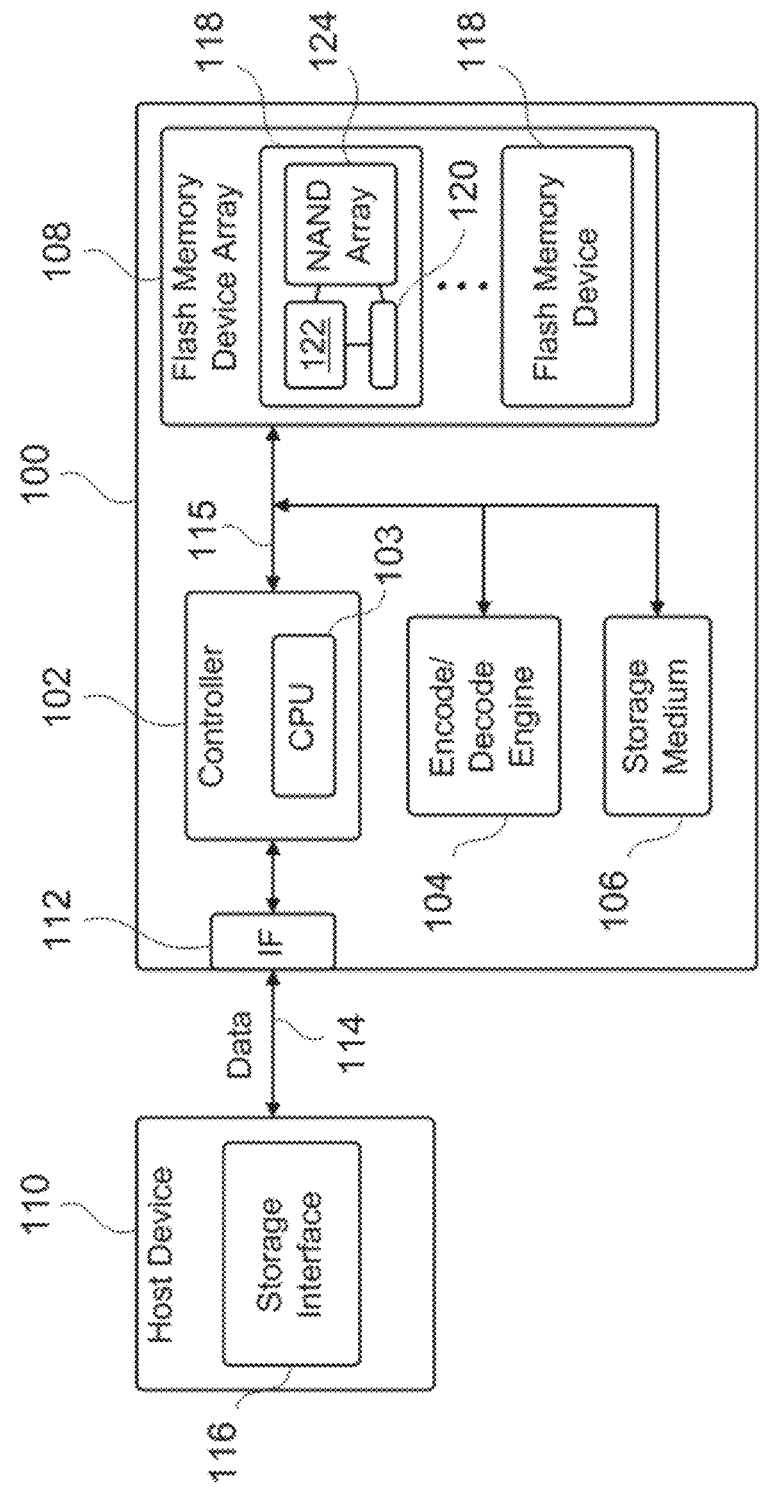
FIG. 3 is a block diagram illustrating components of a data storage system according to illustrative implementations.

FIG. 3 is a block diagram depicting example components of a data storage system 100, according to one or more aspects of the subject technology. Data storage system 100 includes, among other things, controller 102, encode/decode engine 104, storage medium 106, and non-volatile memory device array 108. As depicted in FIG. 3, data storage system 100 may be connected to a host device 110 via host interface 112.

Controller 102 may include several internal components (not shown) such as one or more processors 103, a read-only memory, a non-volatile component interface (for example, a multiplexer to manage instruction and data transport along a connection to non-volatile memory device array 108), an I/O interface, error correction circuitry, and the like. A processor of controller 102 may monitor and control the operation of the components in data storage controller 102. The processor and/or controller 102 may be a multi-core processor, a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. In some implementations, one or more elements of controller 102 may be integrated into a single chip. In some implementations, the elements may be implemented on two or more discrete components.

Controller 102 may execute code or instructions to perform the operations and functionality described herein. For example, controller 102 may perform operations for managing request flow and address mappings, and to perform calculations and generate commands. One or more sequences of instructions may be stored as firmware on memory within controller 102. One or more sequences of instructions may be software stored and read from storage medium 106, non-volatile memory device array 108, or received from host device 110 (for example, via host interface 112). Storage medium 106 and non-volatile memory device array 108 include examples of machine or computer readable media on which instructions/code executable by controller 102 may be stored. Machine or computer readable media may generally refer to any tangible and non-transitory medium or media used to provide instructions to controller 102, including both volatile media, such as dynamic memory used for storage media or for buffers within controller 102, and non-volatile media, such as electronic media, optical media, and magnetic media. The operations and functionality described herein also may be implemented in hardware using logic circuits, for example, or a combination of hardware and software/firmware.

In some aspects, storage medium 106 represents the volatile memory used to temporarily store data and information used to manage data storage system 100. According to aspects of the present disclosure, storage medium 106 is a random access memory (RAM) such as double data rate (DDR) RAM. Other types of RAM also may be used to implement storage medium 106. Storage medium 106 may be implemented using a single RAM module or multiple RAM modules. While storage medium 106 is depicted as being distinct from controller 102, it is understood that storage medium 106 may be incorporated into controller 102 without departing from the scope of the present disclosure. Alternatively, storage medium 106 may be a non-volatile memory such as a magnetic disk, flash memory, peripheral SSD, and the like.

Host interface 112 may be coupled to host device 110, to receive data from and send data to host device 110. Host interface 112 may include both electrical and physical connections for operably coupling host device 110 to controller 102. Host interface 112 may communicate data, addresses, and control signals between host device 110 and controller 102. In this manner, controller 102 may store data received from host device 110 in non-volatile memory device array 108 in response to a write command from host device 110, and to read data stored in non-volatile memory device array 108 and to transfer the read data to host device 110 via host interface 112 in response to a read command from host device 110.

Host device 110 represents any device that may be coupled to data storage system 100 and to store data in data storage system 100. Host device 110 may be a computing system such as a personal computer, a server, a workstation, a laptop computer, PDA, smart phone, and the like. Alternatively, host device 110 may be an electronic device such as a digital camera, a digital audio player, a digital video recorder, and the like.

As further depicted in FIG. 3, host device 110 and data storage system 100 may be in communication with each other via a bus 114. The bus may use suitable interfaces standard including, but not limited to, serial advanced technology attachment (SATA), advanced technology attachment (ATA), small computer system interface (SCSI), PCI-extended (PCI-X), fiber channel, serial attached SCSI (SAS), secure digital (SD), embedded multi-media card (EMMC), universal flash storage (UFS) and peripheral component interconnect express (PCIe). According to some aspects, data storage system 100 may include pins (or a socket) to mate with a corresponding socket (or pins) on host device 110 to establish an electrical and physical connection.

Controller may include an internal system bus 115. System bus 115 may include a combination of a control bus, address bus, and data bus, and connect the components of controller 102 (e.g., a processor and/or memory therein) with other components of data storage system 100, including encode/decode engine 104, storage medium 106, non-volatile memory device array 108, and host interface 112. Data is transferred between the various components over system bus 115. System bus 115 may reside partially external and partially internal to controller 102.

Host device 110 and data storage system 100 may be in communication with each other via a wired or wireless connection and may be local to or remote from one another. According to one or more other aspects, data storage system 100 (or host interface 112) includes a wireless transceiver to place host device 110 and data storage system 100 in wireless communication with each other.

Controller 102 may receive data and/or storage access commands from a storage interface module 116 (e.g., a device driver) of host device 110. Storage access commands communicated by the storage interface module 116 may include read and write commands issued by the host device 110. Read and write commands may specify a logical address, e.g., logical block addresses (LBAs) used to access data stored in the data storage system 100. Controller 102 may execute commands in the non-volatile memory device array 108 in response to commands received from storage interface module 116.

Non-volatile memory device array 108 may include multiple non-volatile memory devices 118. A non-volatile memory device 118 represents a non-volatile memory device for storing data. According to aspects of the subject technology, non-volatile memory device 118 includes, for example, a NAND flash memory. Each non-volatile memory device 118 may include a single non-volatile memory chip or die, or may include multiple non-volatile memory chips or die. For example, within non-volatile memory device array 108, some of the non-volatile memory devices 118 may comprise one non-volatile die while others may comprise more than one non-volatile die. Non-volatile memory device 118 is not limited to any particular capacity or configuration. For example, the number of physical blocks, the number of physical pages per physical block, the number of sectors per physical page, and the size of the sectors may vary within the scope of the subject technology.

Non-volatile memory devices 118 may be arranged in multiple channels, with each channel having one or more non-volatile memory devices 118. A non-volatile memory device 118 may include one or more non-volatile memory interfaces (not shown). Each non-volatile memory interface interfaces the controller 102 to one of the non-volatile memory devices via a corresponding channel. Each of the channels (not shown) may be implemented using one or more physical I/O buses coupled between one of the non-volatile memory interfaces and the corresponding non-volatile device(s). Each channel allows the corresponding non-volatile memory interface to send read, write and/or erase commands to the corresponding non-volatile memory device. Each non-volatile memory interface may include a register (e.g., First-In-First-Out (FIFO) register) that queues read, write and/or erase commands from the controller 102 for the corresponding non-volatile memory device. Although the term "channel," as used above, referred to the bus coupled between a non-volatile memory interface and the corresponding non-volatile memory device, the term "channel" may also refer to the corresponding non-volatile memory device that is addressable through a bus (e.g., system bus 115).

Non-volatile memory device 118 may have a standard interface specification. This standard ensures that chips from multiple manufacturers can be used interchangeably. The interface of non-volatile memory device 118 may be used to access internal registers 120 and an internal non-volatile memory controller 122. In some implementations, registers 120 may include address, command, and/or data registers, which internally retrieve and output the necessary data to and from a NAND memory cell array 124. By way of example, memory cell array 124 may comprise a single-level cell (SLC) memory, a multi-level cell (MLC) memory, a three-level cell (TLC) memory device, etc. In some aspects, the non-volatile memory device array 108 may comprise one or more hybrid memory devices that may function in one or more of a SLC, MLC or TLC mode. Other types of non-volatile memory such as 3D NAND flash memory, FastNAND, Z-NAND, Phase Change Memory, Resistive Random-access memory (RRAM), and/or the like also are contemplated in the subject technology.

Data register (e.g., of registers 120) may include data to be stored in memory cell array 124, or data after a fetch from memory cell array 124, and may also be used for temporary data storage and/or act like a buffer. An address register may store the memory address from which data will be fetched to host device 110 or the address to which data will be sent and stored. In some aspects, a command register is included to control parity, interrupt control, and the like. In some aspects, internal non-volatile memory controller 122 is accessible via a control register to control the general behavior of non-volatile memory device 118. Internal non-volatile controller 122 and/or the control register may control the number of stop bits, word length, receiver clock source, and may also control switching the addressing mode, paging control, co-processor control, and the like.

Encode/decode engine 104 represents one or more components that may encode and/or decode code words to be stored in and/or read from the non-volatile memory device array 108. Encode/decode engine 104 may include an encoder and a decoder. The decoder may include a hard decoder and a soft-decision ECC decoder. Encode/decode engine 104 may encode data received from host device 110 and decode code words read from the non-volatile memory device 118 before sending the decoded data to the host. In some implementations, encode/decode engine 104 may comprise one or more memory devices and/or one or more processing units used to perform error correction (e.g., using LDPC, BCH, or turbo codes). Encode/decode engine 104 may also include a soft information module that determines and/or maintains soft metric inputs for encoding and decoding operations. While encode/decode engine 104 is depicted as being distinct from controller 102, it is understood that encode/decode engine 104 may be incorporated into controller 102 without departing from the scope of the present disclosure.

The controller 102 may be configured to dynamically adjust an amount of physical storage space of the data storage system 100 based on outputs of a machine-learned module (not shown) included within the data storage system 100. In some implementations, the controller 102 may include the machine-learned module. The machine-learned module implements a machine-learned model trained to determine a category or type of workload being processed by the data storage system 100. The machine-learned model may be trained to determine the category or type of workload based on values of input parameters to the machine-learned model. The category or type of workload may indicate the entropy level of data that is being processed. In some implementations, workload may include processing of all data related operations that are related to the commands, such read and/or write commands, received from the host system 110. The machine-learned model may be trained using training data gathered from a population or a set of data storage systems. In some implementations, the population or set of data storage systems may include data storage systems with various physical storage space characteristics and logical schemes. The training data includes data related to a set of input parameters from data storage systems of the population from the first time stress is applied to those data storage systems until the data storage system failed or until a predetermined period of time for collecting such data expired. For example, data for the set of input parameters includes data from the first time data is written to those data storage systems and until one year from the first time or until the data storage system failed. The training data includes data related to the failure point of any data storage system that failed.

The input parameters to the machine-learned model of the machine-learned module may be (i) parameters related to various non-volatile memory array 108 and/or devices 118, (e.g., management and defect detection parameters), and (ii) data storage system operational parameters. These parameters may include hardware defect parameters, for example, block-level failure patterns in a non-volatile memory component, or other hardware defects that may be part of a fault calculation, such as a bit error rate. These input parameters may also include parameters related to a data storage system's hardware and firmware. These input parameters may include parameters that identify hardware defects and failures, and output data from proactive and/or reactive firmware algorithms that are configured to assist with normal operation of a data storage system. In one or more implementations, a proactive firmware algorithm is an algorithm that outputs data, which assists a controller of a data storage system to perform normal operations of a data storage system. Examples of such output data include, but are not limited to, wear-leveling information related to the non-volatile memory devices of the data storage system. In one or more implementations, a reactive firmware algorithm is an algorithm that recovers data by means of RAID or Erasure Coding mechanisms based on redundantly stored data internal to the data storage system, which is utilized by a controller of a data storage system to assist in recovering from a defect of a non-volatile memory device of the data storage system. Examples of such output data include, but are not limited to, data related block-level data recovery of a non-volatile memory device by use of re-tries, RAID or similar schemes internal to the data-storage system.

Examples of such non-volatile memory management and defect detection parameter data include, but are not limited to, non-volatile memory translation layer management events data, controller initiated data movement for non-volatile memory endurance management event data, non-volatile memory translation layer data caching management event data, non-volatile memory page, block and die-level defect density data, non-volatile memory read, program and erase failure defect density data, non-volatile memory page level defect management data, non-volatile memory translation layer backup event data, controller initiated background data movement in non-volatile memory event data, controller initiated background data movement in non-volatile memory for proactively managing page, block, and die-level degradation data, controller initiated data movement in non-volatile memory for reactively managing program and erase failures event data, controller initiated data movement in non-volatile memory for managing defragmentation of the non-volatile memory event data, controller initiated user data cache backup for power loss management events data, non-volatile memory re-read methods event data, controller managed available non-volatile memory writable space data, non-volatile memory raw bit error rate data, controller initiated non-volatile memory erase or rewrite operation management data, controller initiated defect management by redundant array of independent disks (RAID) rebuild for page, block, or die-level failures data, controller initiated event for non-volatile memory data movement and correction in response to errors data.

In some implementations, the data storage system 100 can include multiple sensors. Examples of such sensors include, but are not limited to, temperature sensors and the like. One or more of the sensors may be configured to transmit data captured by the sensors to the controller 102. The controller 102 may be configured to receive the data from the sensors and, based on the data from the sensors, perform operations. In some implementation, the sensor data can be selected as one or more input parameters to the machine-learned model of the machine-learned module, and data from the sensors is transmitted to the machine learned module as input data for the sensors selected as input parameters to the machine-learned model.

The machine-learned model of the machine-learned module is trained using different categories or types of workloads applied to different populations or sets of data storage systems to identify various magnitudes and combinations of its input parameter values that are impacted by the different entropies, categories or types of workloads. In some implementations, a magnitude of a value of an input parameter is an amount of the value. The machine-learned model is trained using input parameters data of data storage systems that failed, degraded, and survived in order for the machine-learned model to learn to identify a set of magnitudes of values of input parameters and combinations of input parameters that are the most affected by the category or type of workload being processed by the data storage system. In some implementations, the machine-learned model may be trained using input parameters data of data storage systems that failed and survived in order for the machine-learned model to learn to rank a set of the input parameters that are the most affected by the category or type of workload being processed by the data storage system. The machine-learned model may be configured to learn certain decision functions from different input training data to the machine-learned model.

The controller 102 may be configured to determine a stress level being experienced by the data storage system by computing various stress factors for a data storage system. In some implementations, the controller 102 may be configured to determine a stress level being experienced by the data storage system based on a stress acceleration factor. The controller 102 may be configured to determine a stress acceleration factor based on a function of a host system driven drive writes per day, drive writes per day specification of the data storage system, and a coefficient. For example, the controller 102 may be configured to determine a stress acceleration factor based on the following:

$$\text{Stress Acceleration Factor} = \left(\frac{\text{Host Driven } DWD}{DWD \text{ Specification}}\right)^{\wedge}0.57 \quad (1)$$

In some implementations, to determine a stress level, the controller 102 may be configured to determine an average program/erase cycles per day based on a function of the write amplification data of the data storage system, over provisioning of the data storage system, host system driven drives per day. For example, the controller 102 may be configured to determine average program/erase cycles per day based on the following:

$$\frac{\text{Average } PE \text{ Cycles}}{\text{Time in 24 hour units}} = \frac{\text{Write Amplification}}{1 + O.P.} * \frac{\text{Host Writes Capacity}}{\text{Time in 24 hour units}} \quad (2)$$

or $$\text{Average } PE \text{ Cycles per Day} = \frac{\text{Write Amplification}}{1 + O.P.} * \text{Host Driven } DWD \quad (3)$$

In some implementations, the controller 102 may be configured to determine when to adjust the physical storage space available to a host system based on the determination of a stress level being experienced by the data storage system. In some implementations, the data storage system may determine a stress level being experienced by the data storage system or an expected stress level based on the amount of physical storage space available to the data storage systems. For example, the controller 102 may be configured to determine stress acceleration based on the following:

$$\text{Stress Acceleration} = \left[\left(\frac{\text{Host - Driven Cycles per Day}}{DWD \text{ Spec. Cycles per Day}}\right) * \left(\frac{1 + OP_{Initial}}{1 + OP_{Modulated}}\right) * \left(\frac{\text{Write} - Amp_1}{\text{Write} - Amp_2}\right)\right]^{\wedge}0.57 \quad (4)$$

In the above function, $OP_{initial}$ refers to an initial amount of over provisioned physical storage space of a data storage system, $OP_{modulated}$ refers to an autonomously adjusted amount of over provisioned physical storage space of the data storage system, Write-$Amp_1$ refers to the write amplification of the data storage system at the initial overprovisioned amount, $OP_{initial}$, and the Write-$Amp_2$ refers to the write amplification of the data storage system at the modulated or adjusted over provisioned physical storage space of a data storage system. In some implementations, the controller 102, based on the above described function, may be configured to determine whether the stress level being experienced by the data storage system reduces to satisfy a threshold stress level based on the adjusted to physical storage space available to the host system 110.

Figure 4:
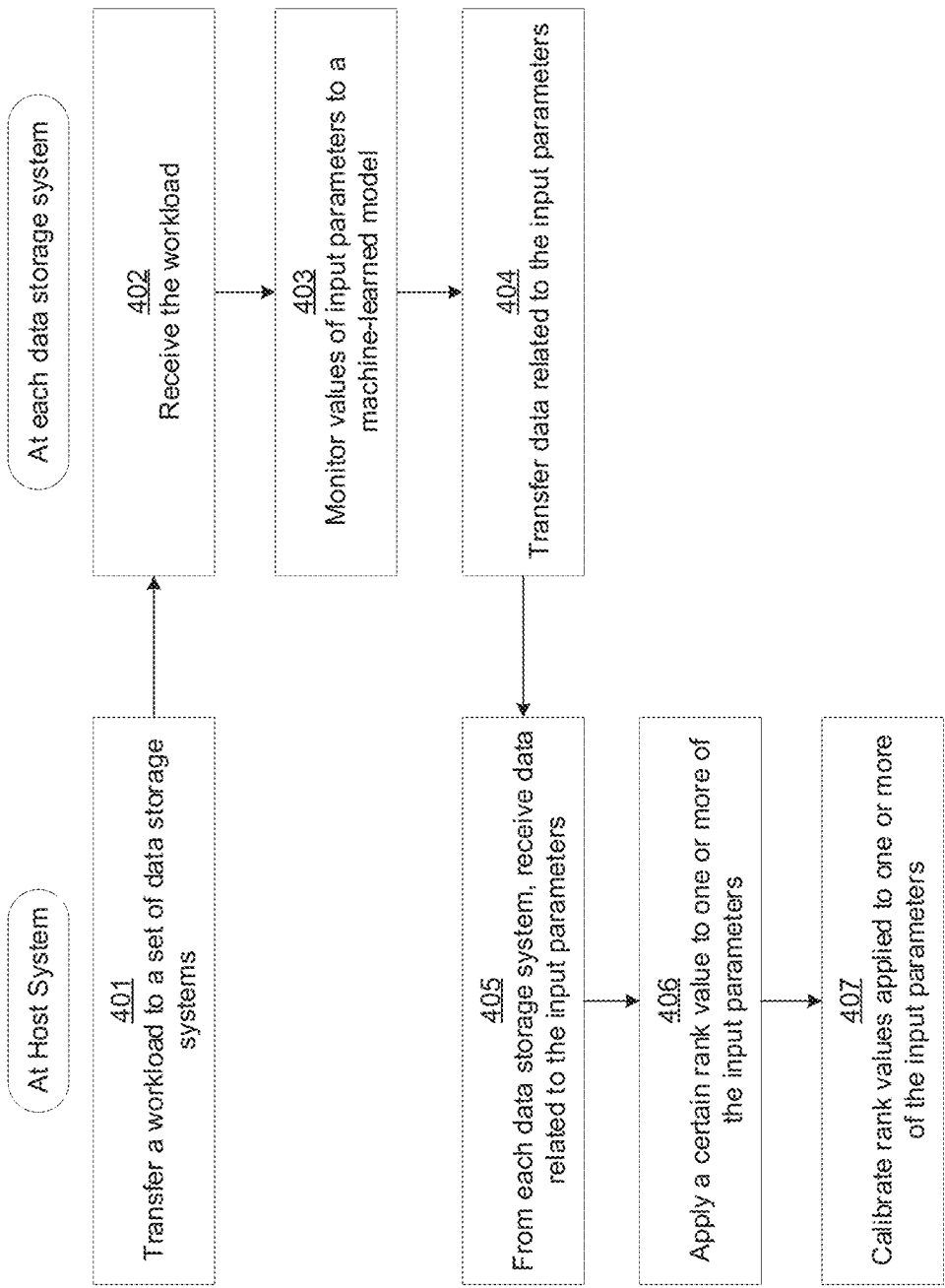
FIG. 4 is a flow chart of an example method of training data storage systems to classify a category of workload according to illustrative implementations.
Figure 5:
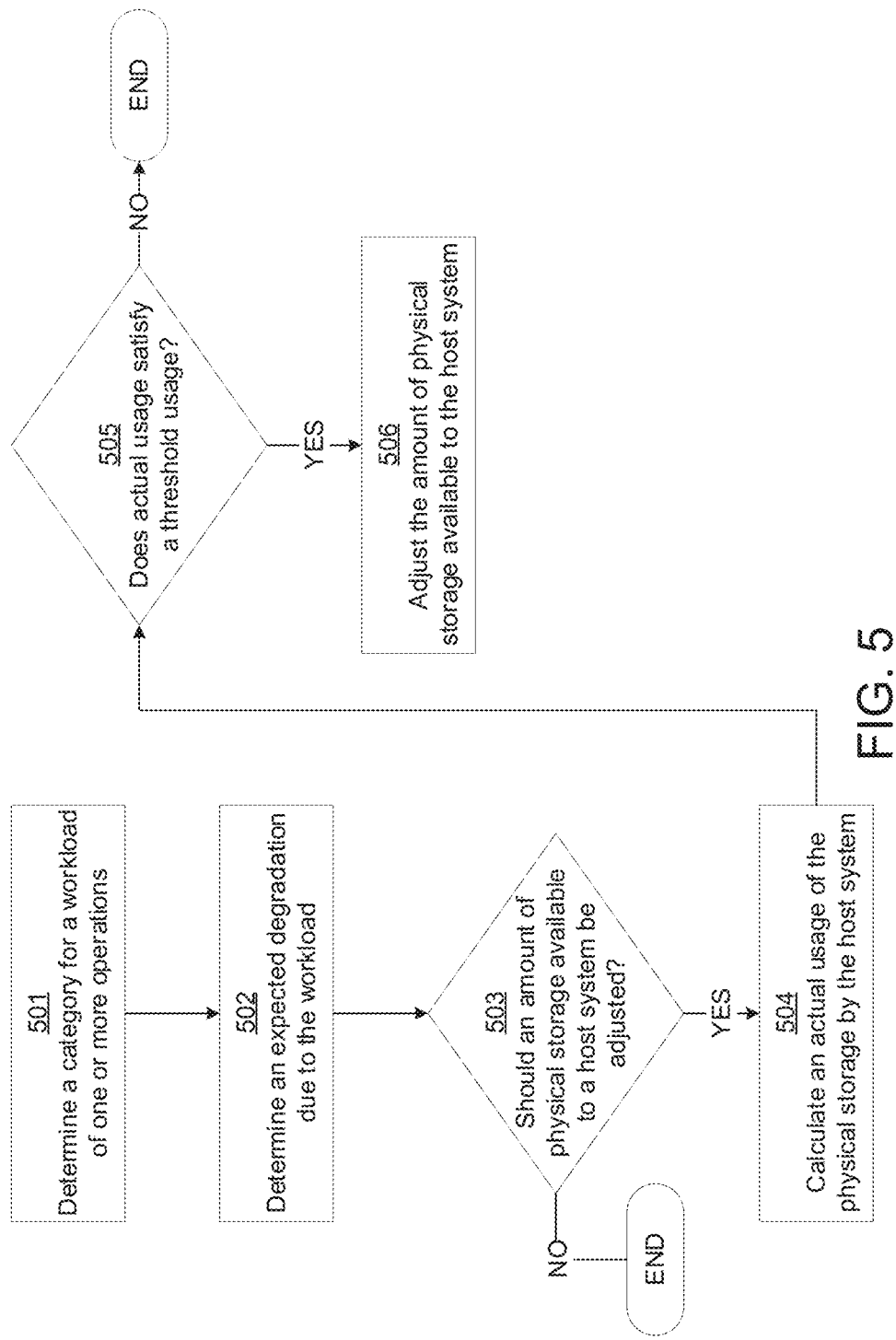
FIG. 5 is a flow chart of an example method of adjusting physical storage space available to a host system according to illustrative implementations.

Additional details of the training of the machine-learned model to determine a category of workload and adjusting the physical storage space available to the host system are described herein and with reference to FIGS. 4 and 5.

Turning now to FIG. 4, there is shown a flowchart illustrating a process of training a machine-learned model for a category or type of workload being processed by data storage systems. For the purpose of illustrating a clear example, components of the data storage system 100 shown and described with reference to FIG. 3 are used to describe the process of training a machine-learned model.

The method 400 includes transferring, by a host system 110, to a set of data storage systems communicatively coupled to the host system 110, such as data storage system 100, a type or category of workload (block 401). The type or category of workload may include reading or writing of data with a certain entropy level. For example, if the type or category of the workload is random, the entropy level of the data of the operations may be high. In this example, the operations may include, for example, reading from or storing data to one or more non-volatile memory devices of the data storage system, and such operations are performed to process the workload. Similarly, if the type or category of the workload is sequential, the entropy level of the data of the operations may be low.

The transferred workload is received, at each data storage system (e.g., data storage system 100), of the set of data storage systems (block 402). The controller of each data storage system, such as the controller 102, may initiate processing of the received workload. In some implementations, the received workload may be processed in an accelerated manner to simulate an amount of workload that may be similar in size to an amount that a data storage system may process over its lifetime. At each data storage system, the controller of the data storage system, such as the controller 102, may be configured to monitor values of a set of input parameters to the machine-learned model, implemented, for example, in the data storage system (e.g., within a data storage system 100 or a component of the data storage system, such as controller 102, and/or storage medium 106) (block 403). In some implementations, the data storage system may be configured with a set of rules that specify the input parameters to the machine-learned model, and the controller of the data storage system may be configured to determine the set of input parameters to monitor, based on the stored set of rules.

Each data storage system transfers data related to the input parameters to the host system (block 404). The data related to the input parameters may include, but are not limited to, values of the input parameters, and the like. In some implementations, each data storage system may be configured to transfer values of the input parameters at the expiration of predetermined period of time. For example, a few months after the processing of the received workload is initiated by the data storage system. In some implementations, each data storage system may be configured to transfer values of the input parameters at the failure of any components of the data storage system, such as, a non-volatile memory device. In some implementations, each data storage system may be configured to transfer values of the input parameters if any performance metric of the data storage system is below a threshold value.

From each data storage system of the set of data storage systems, the host system receives the data related to the input parameters (block 405). The host system may apply a certain rank value to one or more of the input parameters (block 406). The host system may apply a certain rank value to an input parameter based on whether a value of the input parameter satisfies a threshold value for the parameter. In some implementations, the host system may apply a certain rank value based on a set of rules that specify various threshold values to various input parameters. In some implementations, the specified threshold values may represent a minimum value of the input parameter in order for the host system to apply a certain rank value to the input parameter. For example, the host system may compare whether the rank value of an input parameter is above or equal to a threshold value, and if the value of an input parameter is not above or equal to the threshold value, then the host system may be configured to not apply a rank value to the input parameter. In some implementations, the host system may be configured to update a rank value applied to an input parameter by increasing or decreasing the rank value. In some implementations, the host system may be configured to update the rank value of an input parameter based on changes in the value of the input parameter received from different data storage systems. In some implementations, the host system may be configured to rank the input parameters based on the rank values applied to the input parameters. In some implementations, the host system may be configured to update the ranks based on changes to the rank values applied to the input parameters.

The host system may calibrate the rank values applied to the one or more parameters (block 407). The host system may calibrate or adjust the rank values based on the data related to the input parameters received from each data storage system to construct a machine-learned model, such as a random forest model. In some implementations, the host system may calibrate or adjust the rank values based on the values of the input parameters received from each data storage system. In some implementations, through the process of calibration, the host system may determine a range of rank values for one or more of the input parameters based on the rank values applied to the one or more parameters by each data storage system of the set of data storage systems. In some implementations, the host system may train a machine-learned model to learn various decision functions for a category of workload. In some implementations, a decision function may be one or more intermediate machine-learning steps used by a machine-learned model to provide a final output. Each machine-learned model may be trained the various decision functions of a category of workload based on an aggregated data of input parameters received from a population of data storage systems that received that category for workload.

Thus, for each category or type of workload, the machine-learned model is trained with the values and/or combination of the input parameters that result in the trained model. As described above, in some implementations, the machine-learned model is trained with a range of decision functions and/or rank values learned from the values of the input parameters. In one or more examples, a host system may associate a decision function or set of weights of the input parameters to a given category or type of workload. In some implementations, a data storage system, such as the data storage system 100, may store rules or instructions specifying different sets of decision functions learned from input parameters for different categories or types of workload, and the machine-learned models may be configured to determine a probability or likelihood of a category or type of a workload based on a comparison of the weights applied to the input parameters by a controller, such as controller 102, of the data storage system and one or more of the specified sets of weights.

While the foregoing describes a process of training a machine-learned model for one category or type of workload, the same process may be used to train and infer the machine-learned model for multiple categories/types of workload. In one example, one set of data storage systems may be used to train and infer a machine-learned model for one category or type of workload, and another set of data storage system may be used to train and infer the machine-learned model for another category or type of workload. When there are additional categories/types of workload, additional sets of data storage systems may be utilized. In one example, different sets of data storage systems are used for respective categories/types of workload. In another example, one set of data storage systems may be used, e.g., sequentially, for inferring each of the categories/types of workload. In another example, a combination of the two foregoing examples may be used.

Turning now to FIG. 5, there is shown a flowchart illustrating a process of determining a type of workload and adjusting an amount of physical storage space available to the host system, for example, by adjusting the amount of over-provisioned storage space in the data storage system. In some implementations, an over-provisioned storage space refers to the amount of storage space of a data storage system that is reserved for various operations performed by a data storage system and not available for use by a host system. Examples of such operations include, but are not limited to, moving data from memory blocks that are above a wear-leveling threshold to memory blocks that are below the wear-leveling threshold, garbage collection operations to free up memory blocks containing stale or invalidated data that was updated with newer data, stored elsewhere in the data storage system. For the purpose of illustrating a clear example, components of the data storage system 100 shown and described with reference to FIG. 3 are used to describe the process of determining a type of workload and adjusting an amount of physical storage space available to the host system.

The method 500 includes determining, by the controller of the data storage system (e.g., controller 102), a category or type of the workload of one or more operations (block 501). The one or more operations may be processed by the data storage system 100 (e.g., operations processed by the controller 102, operations processed by the non-volatile memory device array 108, operations processed by the non-volatile memory devices 118, operations processed by the non-volatile memory controller 122, and/or some combination thereof). The controller 102 may be configured to determine a category or type of the workload using a machine-learned model and data associated or related to the input parameters to the machine-learned model. Examples of data associated or related to the input parameters include, but are not limited to, values of the input parameters. The values of the input parameters may change as the data storage system 100 processes the operations of the workload. The controller 102 may be configured to determine a category of the workload based on the output of the machine-learned model.

As described above, the machine-learned model may be configured to determine a probability or likelihood of one or more categories or types of workload for the processed workload. The machine-learned model may be configured to determine the probability or likelihood based on the values of the input parameters by the controller 102 and the set of calibrated weights for the input parameters with which the machine-learned model is trained. For example, the machine-learned model may determine a probability or likelihood of a category or type of the workload based on a comparison of decision functions composed of input parameters by the controller 102 and one or more sets of calibrated weights of the input parameters for different categories or types of workload specified by rules, instructions or machine-learned decision functions stored in the data storage system.

In some implementations, for each of the one or more categories or types of workload, the machine-learned model may determine a probability or likelihood that the workload may be of that category or type. For example, if there are three categories or types of workload (e.g., random, mixed, sequential), the machine-learned model may be configured to determine a probability or likelihood for each of the three types (e.g., workload is of the random category=30%, workload is of the mixed category=45%, workload is of the sequential category=75%, and the like). The machine-learned model may be configured to provide the determined probability or likelihood of one or more categories or types as an output. The controller 102 may be configured to determine a category or type of the workload based on the probability or likelihood output of the machine-learned model. For example, the controller 102 may be configured to determine the category or type with the highest probability or likelihood and determine that category or type as the category or type of the workload.

The controller 102 determines an expected degradation of one or more of the non-volatile memory components or devices (e.g., non-volatile memory device array 108, non-volatile memory devices 118, and/or some combination thereof) of the data storage system 100 (block 502). The controller 102 may determine the expected degradation based on the determined category or type of the workload. In some implementations, expected degradation refers to degradation or reduction in operational life of the data storage system due to an expected amount of wear on the non-volatile memory components of the data storage system. In some implementations, the controller 102 may be configured to determine an expected entropy level of the data of the workload or related to the workload based on the determined category or type of the workload, and determine the expected degradation based on the expected entropy level of the data. For example, if a workload is determined to be of the category random workload, then the controller 102 may be configured to determine that the expected entropy level of the data of the workload or related to workload is high, and that the expected degradation of one or more of the non-volatile memory components or devices of the data storage system is high. In some implementations, the controller 102 may be configured to determine an expected entropy level of the data of the workload or related to the workload based on the determined category or type of the workload and rules, decision functions of certain machine-learned models, or instructions that specify an expected entropy level for each type category or type of workload.

In some implementations, the controller 102 may be configured to determine an expected amount of degradation based on entropy level of the data of the workload or related to the workload. For example, if the expected entropy level of the data of the workload or related to the workload is high, then the controller 102 may determine the expected amount of degradation is high to a corresponding level. In some implementations, the controller 102 may be configured to determine an expected amount of degradation to a corresponding level of the expected entropy level of data. For example, if the expected entropy level of data is low, then the controller 102 may determine that the expected amount of degradation is low, or if the expected entropy level of data is high, then the controller 102 may determine that the expected amount of degradation is high. In some implementations, the controller 102 may be configured to determine an expected degradation based on the category or type of the workload and stress level being experienced by the data storage system 100 or one or more of the components thereof (e.g., controller 102, non-volatile memory device array 108, non-volatile memory devices 118, and the like). In some implementations, the controller 102 may be configured to determine a value or grade for the expected degradation.

The controller 102 determines whether to adjust an amount of physical storage space available to the host system (block 503). In some implementations, the amount of physical storage space available to the host system may be adjusted relative to the over-provisioned storage space. For example, the amount of physical storage space available to the host system may be reduced by increasing the over-provisioned storage space. Similarly, the amount of physical storage space available to the host system may be increased by decreasing the over-provisioned storage space. The controller 102 may be configured to determine whether to adjust an amount of physical storage space available to the host system based on the expected degradation of the non-volatile memory components or devices of the data storage system. In some implementations, the controller 102 may be configured to determine to adjust an amount of physical storage space if the expected degradation satisfies a certain threshold (e.g., above or equal to the certain threshold). For example, if the controller 102 determines that expected degradation is high and the threshold is medium, then the controller 102 may determine to adjust the amount of physical storage space available to the host system. As described above, the controller 102 may be configured to adjust the amount of physical storage space available to the host system by trading off the over-provisioned storage space in the data storage system for the amount of physical storage space available to the host system (e.g., increasing the over-provisioned storage space by decreasing the amount of physical storage space available to the host system, or increasing the amount of physical storage space available to the host system by decreasing the over-provisioned storage space). Similarly, if the controller 102 determined the expected degradation to be a value of 40 on a scale of 100 and the threshold value is 35, then the controller 102 may determine to adjust the amount of physical storage space available to the host system. If the controller 102 determines to not adjust the amount of physical storage space available to the host system ('NO' at block 503), then the method 500 terminates. If the controller 102 determines to adjust the amount of physical storage space available to the host system ('YES' at block 503), then the method 500 proceeds to block 504.

The controller 102 calculates or determines actual usage by the host system of the physical storage space available to the host system (block 504). In some implementations, the controller 102 may determine the actual usage by the host system based on historical usage of the data storage system by the controller 102. In some implementations, the controller 102 may determine the actual usage based on a historical pattern of usage by the host system over a certain time period. For example, the controller 102 may determine actual usage based on an average usage level of the physical storage space by the host system over the last hundred days.

The controller 102 determines whether actual usage satisfies a threshold level of usage (block 505). In some implementations, the controller 102 may be configured to determine whether actual usage satisfies a threshold level of usage based on whether the actual usage is equal to or less than the threshold level of usage. In some implementations, the threshold level of usage may be specified as a fraction of the physical storage space available to the host system. If the controller 102 determines that the actual usage does not satisfy the threshold level of usage ('NO' at block 505), then the method terminates. If the controller 102 determines that the actual usage does satisfy the threshold level of usage ('YES' at block 505), then the method proceeds to block 506.

The controller 102 adjusts the amount of physical storage space available to the host system (block 506). The controller 102 may be configured to adjust the physical storage space available to the host system by reducing the physical storage space available and reducing the maximum logical block address (LBA) to a new maximum LBA that corresponds to the reduced physical storage space and/or increased over-provisioned storage space. In some implementations, the physical storage space available to the host system is increased and the maximum LBA is increased to a new maximum LBA that corresponds to the increased physical storage space available to the host system and/or decreased over-provisioned storage space. In some implementations, the controller 102 may be configured to transfer an alert to the host system and adjust the amount of physical storage space available to the host system based on a response from the host system. In some implementations, the alert may include an output of the machine-learned model and/or other data, such as category of workload, expected degradation, usage history of the physical storage space, and the like. For example, the alert to the host system may indicate an expected degradation and the probability of a category of the workload, and the host system may provide a response, based on the expected degradation and the probability of a category of the workload to the data storage system, to decrease the physical storage space. The controller 102 may be configured, based on the received response from the host system, to decrease the physical storage space available to the host system, reduce the maximum LBA to correspond with the reduced physical storage space, and communicate the changes to the maximum LBA to the host system.

The blocks of the flowchart illustrated in FIGS. 4 and 5 have been described as occurring sequentially. The subject technology is not limited to the described sequential performance of the illustrated process. One or more of the blocks may be performed in parallel with other blocks in the illustrated process. Other variations in the illustrated process are within the scope of the subject technology.

Various examples of aspects of the disclosure are described below. These are provided as examples, and do not limit the subject technology.

In one or more implementations, a data storage system includes a controller and one or more non-volatile memory devices. The controller is configured to determine a category for a workload of one or more operations being processed by the data storage system, using a machine-learned model, based on data associated with a plurality of input parameters to the machine-learned model. The controller is configured to determine, based on the determined category, an expected degradation of the one or more non-volatile memory devices. The controller is configured to adjust, based on the expected degradation and an actual usage of physical storage of the data storage system by a host system, an amount of physical storage of the data storage system available to the host system.

In one or more implementations, the controller is configured to determine based on the category for the workload and the expected degradation, whether to adjust an amount of physical storage of the data storage system available to a host system. The controller is configured to calculate, based on a usage history by the host system, an actual usage of the physical storage by the host system, when the amount of physical storage of the data storage system available to the host system is determined to be adjusted. The controller is configured to determine whether the actual usage of the physical storage by the host system satisfies a threshold usage. The controller is configured to adjust the amount of physical storage of the data storage system available to the host system, when the actual usage of the physical storage by the host system satisfies the threshold usage. In one or more examples, the controller may adjust the amount of physical storage by increasing the overprovisioned storage space. In one or more examples, the controller may adjust the amount of physical storage by decreasing the overprovisioned storage space.

In one or more implementations, the controller is configured to determine, based on the category for the workload and the expected degradation, a lifetime and performance measurement of one or more non-volatile memory devices of the data storage system. In one or more implementations, the controller is configured to determine based on the category for the workload, the expected degradation, lifetime, and/or performance of one or more non-volatile memory devices, whether to adjust an amount of physical storage of the data storage system available to a host system.

In one or more implementations, a computer implemented method includes determining a category for a workload of one or more operations being processed by the data storage system, using a machine-learned model, based on data associated with a plurality of input parameters to the machine-learned model. The method includes determining, based on the determined category, an expected degradation of one or more non-volatile memory devices of the data storage system. The method includes adjusting, based on the expected degradation and an actual usage of physical storage of the data storage system by a host system, an amount of physical storage of the data storage system available to the host system.

In one or more implementations, the method includes determining, based on the category for the workload and the expected degradation, whether to adjust an amount of physical storage of the data storage system available to a host system. The method includes in response to determining the amount of physical storage of the data storage system available to the host system be adjusted, calculating, based on a usage history by the host system, an actual usage of the physical storage by the host system. The method includes in response to determining the amount of physical storage of the data storage system available to the host system be adjusted, determining whether the actual usage of the physical storage by the host system satisfies a threshold usage. The method includes in response to determining that the actual usage of the physical storage by the host system satisfies the threshold usage, adjusting the amount of physical storage of the data storage system available to the host system.

In one or more implementations, the method includes determining, based on the category for the workload and the expected degradation, a lifetime and performance measurement of one or more non-volatile memory devices of the data storage system. In one or more implementations, the method includes determining, based on the category for the workload, the expected degradation, lifetime, and/or performance of one or more non-volatile memory devices, whether to adjust an amount of physical storage of the data storage system available to a host system.

In one or more implementations, the data storage system includes one or more non-volatile memory devices. The data storage system includes a means for determining a category for a workload of one or more operations being processed by the data storage system, using a machine-learned model, based on data associated with a plurality of input parameters to the machine-learned model. The data storage system includes a means for determining, based on the determined category, an expected degradation of one or more non-volatile memory devices of the data storage system. The data storage system includes a means for adjusting, based on the expected degradation and an actual usage of physical storage of the data storage system by a host system, an amount of physical storage of the data storage system available to the host system.

In one or more implementations, the data storage system includes a means for determining, based on the category for the workload and the expected degradation, whether to adjust an amount of physical storage of the data storage system available to a host system. In response to determining the amount of physical storage of the data storage system available to the host system be adjusted, the data storage system includes a means for calculating, based on a usage history by the host system, an actual usage of the physical storage by the host system. In response to determining the amount of physical storage of the data storage system available to the host system be adjusted, the data storage system includes a means for determining whether the actual usage of the physical storage by the host system satisfies a threshold usage. In response to determining that the actual usage of the physical storage by the host system satisfies the threshold usage, the data storage system includes means for adjusting the amount of physical storage of the data storage system available to the host system.

In one or more implementations, the data storage system includes means for determining, based on the category for the workload and the expected degradation, a lifetime and performance measurement of one or more non-volatile memory devices of the data storage system. In one or more implementations, the data storage system includes means for determining, based on the category for the workload, the expected degradation, lifetime, and/or performance of one or more non-volatile memory devices, whether to adjust an amount of physical storage of the data storage system available to a host system.

In one or more implementations, a non-transitory machine-readable medium includes machine-executable instructions thereon that, when executed by a processor, perform a method. The method includes determining a category for a workload of one or more operations being processed by the data storage system, using a machine-learned model, based on data associated with a plurality of input parameters to the machine-learned model. The method includes determining, based on the determined category, an expected degradation of one or more non-volatile memory devices of the data storage system. The method includes adjusting, based on the expected degradation and an actual usage of physical storage of the data storage system by a host system, an amount of physical storage of the data storage system available to the host system.

In one or more implementations, the non-transitory machine-readable medium includes machine-executable instructions thereon that, when executed by a processor, perform a method that includes determining, based on the category for the workload and the expected degradation, whether to adjust an amount of physical storage of the data storage system available to a host system. The method includes in response to determining the amount of physical storage of the data storage system available to the host system be adjusted, calculating, based on a usage history by the host system, an actual usage of the physical storage by the host system. The method includes in response to determining the amount of physical storage of the data storage system available to the host system be adjusted, determining whether the actual usage of the physical storage by the host system satisfies a threshold usage. The method includes in response to determining that the actual usage of the physical storage by the host system satisfies the threshold usage, adjusting the amount of physical storage of the data storage system available to the host system relative to the overprovisioned storage space.

In one or more implementations, the non-transitory machine-readable medium includes machine-executable instructions thereon that, when executed by a processor, perform the method that includes determining, based on the category for the workload and the expected degradation, a lifetime and performance measurement of one or more non-volatile memory devices of the data storage system. In one or more implementations, the method includes determining, based on the category for the workload, the expected degradation, lifetime, and/or performance of one or more non-volatile memory devices, whether to adjust an amount of physical storage of the data storage system available to a host system.

It is understood that other configurations of the subject technology will become readily apparent to those skilled in the art from the detailed description herein, wherein various configurations of the subject technology are shown and described by way of illustration. The subject technology is capable of other and different configurations and its several details are capable of modification in various other respects, all without departing from the scope of the subject technology. Accordingly, the drawings and detailed description are to be regarded as illustrative in nature and not as restrictive.

Many of the above-described features of example process and related features and applications, may be implemented as software or firmware processes that are specified as a set of instructions recorded on a processor-readable storage medium (also referred to as computer-readable medium). When these instructions are executed by one or more processing unit(s) (e.g., one or more processors, cores of processors, or other processing units), the processing unit(s) are caused to perform the actions indicated in the instructions. Examples of processor-readable media include, but are not limited to, volatile memory, non-volatile memory, as well as other forms of media such as magnetic media, optical media, and electronic media. The processor-readable media does not include carrier waves and electronic signals communicated wirelessly or over wired connections.

The term "software" is meant to include, where appropriate, firmware residing in memory or applications stored in memory, which may be read into a working memory for processing by a processor. Also, in some implementations, multiple software aspects of the subject disclosure may be implemented as sub-parts of a larger program while remaining distinct software aspects of the subject disclosure. In some implementations, multiple software aspects may also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code).

It is understood that illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject disclosure.

It is understood that the specific order or hierarchy of steps in the processes disclosed is presented as an illustration of some exemplary approaches. Based upon design preferences and/or other considerations, it is understood that the specific order or hierarchy of steps in the processes may be rearranged. For example, in some implementations some of the steps may be performed simultaneously. Thus the accompanying method claims present elements of the various steps in a sample order, and are not meant to be limited to the specific order or hierarchy presented.

The previous description is provided to enable any person skilled in the art to practice the various aspects described herein. The previous description provides various examples of the subject disclosure, and the subject disclosure is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

The phrases "in communication with" and "coupled" mean in direct communication with or in indirect communication with via one or more components named or unnamed herein.

A phrase such as an "aspect" does not imply that such aspect is essential to the subject disclosure or that such aspect applies to all configurations of the subject disclosure. A disclosure relating to an aspect may apply to all configurations, or one or more configurations. An aspect may provide one or more examples. A phrase such as an aspect may refer to one or more aspects and vice versa. A phrase such as an "implementation" does not imply that such implementation is essential to the subject disclosure or that such implementation applies to all configurations of the subject disclosure. A disclosure relating to an implementation may apply to all aspects, or one or more aspects. An implementation may provide one or more examples. A phrase such as an "implementation" may refer to one or more implementations and vice versa. A phrase such as a "configuration" does not imply that such configuration is essential to the subject disclosure or that such configuration applies to all configurations of the subject disclosure. A disclosure relating to a configuration may apply to all configurations, or one or more configurations. A configuration may provide one or more examples. A phrase such as a "configuration" may refer to one or more configurations and vice versa.

The word "exemplary" is used to mean "serving as an example or illustration." Any aspect or design described herein as "exemplary" is not necessarily to be construed as preferred or advantageous over other aspects or designs.

What is claimed is:

1. A machine-implemented method for a data storage system comprising one or more non-volatile memories, the machine-implemented method comprising:
    causing a machine-learned model to be trained or prepared for determining a category for a workload of one or more operations being executed by the data storage system, wherein causing the machine-learned model to be trained or prepared comprises:
        receiving, at the data storage system, an example category for the workload;
        monitoring values of input parameters to the machine-learned model; and
        applying a rank value to one or more of the input parameters,
    wherein the rank value to the one or more of the input parameters is applied based on whether a respective value of a respective input parameter of the one or more of the input parameters satisfies a respective threshold value for the respective input parameter of the one or more of the input parameters.

2. The machine-implemented method of claim 1, further comprising:
    determining, using the machine-learned model, the category for the workload of the one or more operations being executed by the data storage system; and
    based on the category, a projected degradation, and an actual storage usage of the data storage system, regulating an amount of available storage of the data storage system,
    wherein the projected degradation is associated with one or more non-volatile memories of the data storage system.

3. The machine-implemented method of claim 1, wherein the category for the workload comprises an entropy type for the workload, and the entropy type comprises at least one of the following:
- a random workload type associated with reading or writing using randomly addressed memory blocks;
- a sequential workload type associated with reading or writing using contiguously addressed memory blocks; and
- a mixed workload type associated with reading or writing using randomly addressed memory blocks and contiguously addressed memory blocks.

4. The machine-implemented method of claim 1, wherein causing the machine-learned model to be trained or prepared further comprises:
- calibrating the rank value applied to one or more of the input parameters.

5. The machine-implemented method of claim 4, wherein:
- the example category for the workload is received from a host system;
- the values of input parameters to the machine-learned model are transferred to the host system;
- the rank value to the one or more of the input parameters is applied by the host system; and
- the rank value to the one or more of the input parameters is calibrated by the host system;
- wherein the host system and the data storage system are communicably coupled with each other.

6. The machine-implemented method of claim 1, wherein the receiving, at the data storage system, the example category for the workload comprises:
- processing the example category for the workload in a manner to simulate an amount of workload similar in size to an amount that the data storage system processes over its lifetime.

7. The machine-implemented method of claim 1, wherein the monitoring values of the input parameters to the machine-learned model comprises:
- determining a set of the input parameters to monitor, based on a stored set of rules.

8. The machine-implemented method of claim 5, wherein the calibrating the rank value applied to the one or more of the input parameters comprises:
- adjusting the rank value applied to the one or more of the input parameters based on the values of input parameters to the machine-learned model.

9. A data storage system, comprising:
- one or more controllers configured to cause:
- causing a machine-learned model to be trained or prepared for determining a category for a workload of one or more operations being executed by the data storage system, wherein causing the machine-learned model to be trained or prepared comprises:
  - receiving, at the data storage system, an example category for the workload; and
  - monitoring values of input parameters to the machine-learned model,
- wherein the receiving, at the data storage system, the example category for the workload comprises:
  - processing the example category for the workload in a manner to simulate an amount of workload similar in size to an amount that the data storage system processes over its lifetime.

10. The data storage system of claim 9, wherein the one or more controllers are configured to further cause:
- determining, using the machine-learned model, the category for the workload of the one or more operations being executed by the data storage system; and
- based on the category, a projected degradation, and an actual storage usage of the data storage system, regulating an amount of available storage of the data storage system,
- wherein the projected degradation is associated with one or more non-volatile memories of the data storage system.

11. The data storage system of claim 9, wherein the category for the workload comprises an entropy type for the workload, and the entropy type comprises at least one of the following:
- a random workload type associated with reading or writing using randomly addressed memory blocks;
- a sequential workload type associated with reading or writing using contiguously addressed memory blocks; and
- a mixed workload type associated with reading or writing using randomly addressed memory blocks and contiguously addressed memory blocks.

12. The data storage system of claim 9, wherein causing the machine-learned model to be trained or prepared further comprises:
- applying a rank value to one or more of the input parameters; and
- calibrating the rank value applied to one or more of the input parameters.

13. The data storage system of claim 12, wherein:
- the example category for the workload is for being received from a host system;
- the values of input parameters to the machine-learned model are for being transferred to the host system;
- the rank value to the one or more of the input parameters is for being applied by the host system;
- the rank value to the one or more of the input parameters is for being calibrated by the host system; and
- the host system and the data storage system are for being communicably coupled with each other.

14. The data storage system of claim 13, wherein the calibrating the rank value applied to the one or more of the input parameters comprises:
- adjusting the rank value applied to the one or more of the input parameters based on the values of input parameters to the machine-learned model.

15. The data storage system of claim 12, wherein the rank value to the one or more of the input parameters is for being applied based on whether a respective value of a respective input parameter of the one or more of the input parameters satisfies a respective threshold value for the respective input parameter of the one or more of the input parameters.

16. The data storage system of claim 9, wherein the monitoring values of the input parameters to the machine-learned model comprises:
- determining a set of the input parameters to monitor, based on a stored set of rules.

17. An apparatus, comprising:
- means for causing a machine-learned model to be trained or prepared for determining a category for a workload of one or more operations being executed by a data storage system, wherein the means for causing the machine-learned model to be trained or prepared comprises:

means for receiving, at the data storage system, an example category for the workload;
means for monitoring values of input parameters to the machine-learned model; and
means for applying a rank value to one or more of the input parameters, wherein:

the example category for the workload is for being received from a host system;

the values of input parameters to the machine-learned model are for being transferred to the host system;

the rank value to the one or more of the input parameters is for being applied by the host system; and the host system and the data storage system are for being communicably coupled with each other.

18. The apparatus of claim 17, wherein the means for causing the machine-learned model to be trained or prepared further comprises:

means for calibrating the rank value applied to one or more of the input parameters.

19. The apparatus of claim 18, wherein the rank value to the one or more of the input parameters is for being calibrated by the host system.

* * * * *